United States Patent
Nam et al.

(10) Patent No.: US 9,684,104 B2
(45) Date of Patent: Jun. 20, 2017

(54) THIN FILM POLARIZER HAVING SUPERIOR OPTICAL PROPERTIES, MANUFACTURING METHOD THEREOF, AND POLARIZING PLATE AND DISPLAY DEVICE INCLUDING THE SAME

(71) Applicant: LG CHEM, LTD., Seoul (KR)

(72) Inventors: Sung-Hyun Nam, Daejeon (KR); Jong-Hyun Jung, Daejeon (KR); Kyun-Il Rah, Daejeon (KR); Hye-Min Yu, Daejeon (KR)

(73) Assignee: LG CHEM, LTD., Seoul (KR)

( * ) Notice: Subject to any disclaimer, the term of this patent is extended or adjusted under 35 U.S.C. 154(b) by 258 days.

(21) Appl. No.: 14/386,296

(22) PCT Filed: Jun. 12, 2014

(86) PCT No.: PCT/KR2014/005184
§ 371 (c)(1),
(2) Date: Sep. 18, 2014

(87) PCT Pub. No.: WO2014/204132
PCT Pub. Date: Dec. 24, 2014

(65) Prior Publication Data
US 2016/0103260 A1      Apr. 14, 2016

(30) Foreign Application Priority Data

Jun. 18, 2013  (KR) .................. 10-2013-0069634
Jun. 3, 2014   (KR) .................. 10-2014-0067776

(51) Int. Cl.
*B29C 65/00*    (2006.01)
*B32B 37/14*    (2006.01)
(Continued)

(52) U.S. Cl.
CPC ............. *G02B 5/3033* (2013.01); *B29D 7/01* (2013.01); *B32B 27/00* (2013.01); *B32B 38/10* (2013.01);
(Continued)

(58) Field of Classification Search
USPC ........ 156/229, 242, 243, 247, 281, 701, 714
See application file for complete search history.

(56) References Cited

U.S. PATENT DOCUMENTS

| | | | | |
|---|---|---|---|---|
| 9,158,051 | B2* | 10/2015 | Nam | .................... G02B 5/3033 |
| 9,304,239 | B2* | 4/2016 | Nam | .................... G02B 5/3033 |
| 2004/0189907 | A1* | 9/2004 | Tominaga | ......... G02F 1/133528 |
| | | | | 349/115 |
| 2009/0128745 | A1* | 5/2009 | Ikeda | ................... G02B 5/3025 |
| | | | | 349/96 |

(Continued)

FOREIGN PATENT DOCUMENTS

| | | |
|---|---|---|
| CN | 102326105 A | 1/2012 |
| JP | 1998-153709 A | 6/1998 |

(Continued)

*Primary Examiner* — Sing P Chan
(74) *Attorney, Agent, or Firm* — Dentons US LLP (57) ABSTRACT

There are provided a thin film polarizer having superior optical properties and a method of manufacturing the same. The thin film polarizer includes: forming a film laminate by attaching a non-stretched polyvinyl alcohol (PVA)-based film to at least one surface of a thermoplastic polyurethane film, using attractive force therebetween or using an adhesive; stretching the film laminate at a temperature of 45° C. to 55° C.; and separating the PVA-based film from the thermoplastic polyurethane film.

12 Claims, 2 Drawing Sheets

(51) Int. Cl.
  *B32B 37/16* (2006.01)
  *B32B 37/20* (2006.01)
  *B32B 37/10* (2006.01)
  *G02B 5/30* (2006.01)
  *G02B 1/08* (2006.01)
  *B29D 7/01* (2006.01)
  *B32B 27/00* (2006.01)
  *B32B 38/10* (2006.01)
  *B29L 11/00* (2006.01)
  *B32B 38/00* (2006.01)
  *B29C 55/06* (2006.01)

(52) U.S. Cl.
  CPC ............... *G02B 1/08* (2013.01); *B29C 55/06* (2013.01); *B29L 2011/0066* (2013.01); *B32B 2038/0028* (2013.01); *B32B 2307/412* (2013.01); *B32B 2307/42* (2013.01); *B32B 2307/542* (2013.01); *B32B 2309/02* (2013.01); *B32B 2331/04* (2013.01)

(56) References Cited

U.S. PATENT DOCUMENTS

| | | |
|---|---|---|
| 2010/0100917 A1 | 4/2010 | Chiao et al. |
| 2010/0157426 A1 | 6/2010 | Matsunami et al. |
| 2010/0202051 A1 | 8/2010 | Yoshimi et al. |
| 2011/0315306 A1 | 12/2011 | Goto et al. |
| 2012/0327512 A1 | 12/2012 | Goto et al. |

FOREIGN PATENT DOCUMENTS

| | | |
|---|---|---|
| JP | 1999-258424 A | 9/1999 |
| JP | 1999-326639 A | 11/1999 |
| JP | 2000-338329 A | 12/2000 |
| JP | 2010-026270 A | 2/2010 |
| JP | 2010-145866 A | 7/2010 |
| JP | 2012-208534 A | 10/2012 |
| JP | 2013-033085 A | 2/2013 |
| KR | 10-2010-0071998 | 6/2010 |
| KR | 10-2011-0118825 | 11/2011 |
| KR | 1020140063451 A | 5/2014 |

\* cited by examiner

THIN FILM POLARIZER HAVING SUPERIOR OPTICAL PROPERTIES, MANUFACTURING METHOD THEREOF, AND POLARIZING PLATE AND DISPLAY DEVICE INCLUDING THE SAME

This application is a National Stage Application of International Patent Application No. PCT/KR2014/005184, filed on Jun. 12, 2014, which claims priority to and the benefit of Korean Patent Application Nos. 10-2013-0069634 filed on Jun. 18, 2013, and 10-2014-0067776 filed on Jun. 3, 2014, in the Korean Intellectual Property Office, all of which are hereby incorporated by reference.

TECHNICAL FIELD

The present disclosure relates to a thin film polarizer, a manufacturing method thereof, and a polarizing plate and a display device including the same, and more particularly, to a thin film polarizer having superior optical properties and having a thickness of 10 μm or less, a manufacturing method thereof, and a polarizing plate and a display device including the same.

BACKGROUND ART

A polarizer used in a polarizing plate is an optical device for converting natural light or randomly polarized light into light polarized in a certain direction, and it has been widely used in display devices such as liquid crystal displays (LCDs) and organic light emitting diodes (OLEDs). As a polarizer commonly used in such display devices, a polyvinyl alcohol (PVA)-based polarizing film containing an iodine compound or a dichroic dye and having molecular chains oriented in a predetermined direction has generally been used.

The PVA-based polarizing film may be manufactured by dyeing a PVA-based film with iodine or a dichroic dye and stretching and crosslinking the film in a predetermined direction. In this case, the stretching process may be performed through wet stretching in a solution such as an aqueous boric acid solution or an aqueous iodine solution, dry stretching in the atmosphere, or the like. In the aforementioned manufacturing process according to the related art, the PVA-based film needs to have a thickness exceeding 60 μm, prior to the stretching thereof, in order to perform stretching thereon without the occurrence of breakage. In a case in which the thickness of the PVA-based film is less than 60 μm prior to the stretching process, the degree of swelling in the PVA-based film may be increased, and a modulus of such a thin film per unit area may be increased during the stretching process, whereby breakage of the film may easily occur.

Meanwhile, in accordance with a recent trend for the thinning of display devices, polarizing plates also need to have a reduced thickness. However, in the case in which a PVA-based film having a thickness exceeding 60 μm is used according to the related art, there has been a limitation in reducing the thickness of a polarizer. Therefore, research into manufacturing a polarizer having a reduced thickness has been carried out.

Korean Patent Laid-Open Publication No. 2010-0071998 discloses a method for manufacturing a thin polarizing plate using a laminate fabricated by coating a base layer with a hydrophilic polymer layer, or co-extruding a base layer-forming material and a hydrophilic polymer layer-forming material. However, in the case of using the coating or co-extruding method, the PVA layer and the base layer may not easily be separated from each other after stretching. Since a high degree of peel strength is required for the separation therebetween, defects such as damage to or a deformation of the PVA layer may occur during the separation process, resulting in a deterioration of optical properties of the PVA-based film, such as the degree of polarization and the like. In addition, in the case of using the coating or co-extruding method, since the PVA-based film is manufactured by melting a PVA resin and then co-extruding the PVA layer and the base layer, or by preparing the PVA resin as a coating solution and then applying the coating solution to the base layer, the physical properties of the manufactured PVA film may be easily changed, depending on extruding conditions, coating conditions or film forming conditions. Thus, the physical properties of the resultant PVA film may deteriorate and uniformity thereof may not be obtained.

Therefore, a thin film polarizer having superior optical properties needs to be manufactured.

DISCLOSURE

Technical Problem

In order to solve the above problems, an aspect of the present disclosure provides a thin polyvinyl alcohol (PVA)-based polarizer having superior optical properties, in particular, a single transmittance of 40% to 45% and a degree of polarization of 99% or higher, and having a thickness of 10 μm or less, and a manufacturing method thereof.

Technical Solution

According to an aspect of the present disclosure, there is provided a method of manufacturing a thin film polarizer including: forming a film laminate by attaching a non-stretched polyvinyl alcohol (PVA)-based film to at least one surface of a thermoplastic polyurethane film, using attractive force therebetween or using an adhesive; stretching the film laminate at a temperature of 45° C. to 55° C.; and separating the PVA-based film from the thermoplastic polyurethane film.

The non-stretched PVA-based film may have a thickness of 10 μm to 60 μm. The stretching of the film laminate may be performed in an aqueous boric acid solution having a boric acid concentration of 1% to 5%, preferably 1% to 3%.

The separating of the PVA-based film from the thermoplastic polyurethane film may be performed using a peel strength of 2N/2 cm or less.

The method may further include dyeing the film laminate with at least one of iodine and a dichroic dye, prior to the stretching of the film laminate, and drying the stretched film laminate after the stretching of the film laminate.

According to another aspect of the present disclosure, there is provided a thin film polarizer having a thickness of 10 μm or less, a single transmittance of 40% to 45%, a degree of polarization of 99.0% or higher, and a standard deviation of 0.002% or less in degrees of polarization measured at ten equidistant points in a width direction of the polarizer. In addition, there are provided a polarizing plate and a display device including the thin film polarizer as described above.

Advantageous Effects

In a method of manufacturing a thin film polarizer according to exemplary embodiments of the present disclosure, a polyurethane film may be used as a base film and a stretching process may be performed at a predetermined temperature, whereby a thin film polarizer may be manufactured to have superior optical properties through a stable process. The thin film polarizer manufactured using the aforementioned method may have a thickness of 10 μm or less, which is significantly thin, and may have superior optical properties in terms of single transmittance, polarization, chromaticity and the like.

BEST MODE

Hereinafter, embodiments of the present disclosure will be described in detail with reference to the accompanying drawings.

As a result of repeated research into manufacturing a polarizer having superior optical properties while being significantly thin, i.e., having a thickness of 10 μm or less, without the occurrence of breakage, the inventors of the polarizer described herein found that the aforementioned objectives could be achieved by attaching a polyvinyl alcohol (PVA)-based film to a polymer film, using weak attractive force therebetween or using an adhesive, and then stretching the attached films, and filed Korean Patent Application Nos. 10-2012-0130576 and 10-2012-0130577 relating thereto.

Through additional research, the inventors found that a thin film polarizer having significantly improved optical properties may be manufactured using a thermoplastic polyurethane film as a polymer film and stretching the film at a predetermined temperature in the method of manufacturing a thin film polarizer set forth in the filed applications, as compared with using different types of film, and invented the polarizer set forth herein based on the research results.

A method of manufacturing a thin film polarizer according to an exemplary embodiment of the present disclosure may include forming a film laminate by attaching a non-stretched PVA-based film to at least one surface of a thermoplastic polyurethane film, using attractive force therebetween or using an adhesive; stretching the film laminate at a temperature of 45° C. to 55° C.; and separating the PVA-based film from the polyurethane film.

Here, the thermoplastic polyurethane film is used to prevent the breakage of the PVA-based film. According to the research conducted by the inventors, a relatively high stretching magnification is allowable by using a polyurethane film as a base film, as compared with using different films, and since the thermal contraction characteristics of the polyurethane film is similar to that of the PVA-based film and the polyurethane film is able to induce a smooth contraction in a width of the stretched PVA-based film during a drying process, whereby a thin film polarizer having superior optical properties may be manufactured.

The thermoplastic polyurethane film used in the exemplary embodiment of the present disclosure may be stretched at the maximum magnification of 5 times or greater, preferably of 8 times or greater, at a temperature of 45° C. to 55° C., but is not limited thereto.

Here, a thickness of the polyurethane film may be 20 μm to 100 μm, preferably 30 μm to 80 μm. In a case in which the thickness of the polyurethane film is less than 20 μm, the possibility of breakage may be increased. In a case in which the thickness of the polyurethane film exceeds 100 μm, stretching efficiency may be reduced after the forming of the film laminate.

Meanwhile, a thickness of the PVA-based film attached to the thermoplastic polyurethane film may be 10 μm to 60 μm, preferably 10 μm to 40 μm. In a case in which the thickness of the PVA-based film exceeds 60 μm, it may be difficult to allow the PVA-based film to have a thickness of 10 μm or less even after stretching. In a case in which the thickness of the PVA-based film is less than 10 μm, the breakage of the PVA-based film may occur during the stretching process.

Meanwhile, the PVA-based film may have a degree of polymerization of about 1,000 to 10,000, preferably, about 1,500 to 5,000, but is not limited thereto. In a case in which the degree of polymerization of the PVA-based film is within the above range, molecules may move freely and may be smoothly combined with iodine, a dichroic dye, or the like.

Meanwhile, the PVA-based film according to the exemplary embodiment of the present disclosure may be a commercially available PVA-based film, for example, PE20, PE30 or PE60 manufactured by Kuraray, M2000, M3000 or M6000 manufactured by Nippon Synthetic Chemical Industry Co., Ltd., or the like.

Meanwhile, in the exemplary embodiment of the present disclosure, the thermoplastic polyurethane film and the PVA-based film may be attached to one another using weak attractive force generated between surfaces of the thermoplastic polyurethane film and the non-stretched PVA-based film without a separate medium, or using an adhesive.

In the case of attaching the thermoplastic polyurethane film and the PVA-based film to one another using the attractive force, a surface treatment may be performed on one surface or both surfaces of the thermoplastic polyurethane film or the PVA-based film to allow them to have an appropriate degree of adhesive strength. Here, the surface treatment may be performed through various surface treatment methods commonly known in the art to which the present disclosure pertains, for example, a corona treatment, a plasma treatment, or a surface modification treatment using a strongly alkaline aqueous solution such as NaOH or KOH.

Meanwhile, in the case of attaching the non-stretched polymer film and the non-stretched PVA-based film to one another using the adhesive, a thickness of the adhesive layer prior to the stretching of the film laminate may be nm to 4,000 nm, preferably 20 nm to 1,000 nm, more preferably 20 nm to 500 nm. The thickness of the adhesive layer after the stretching of the film laminate may be 10 nm to 1,000 nm, preferably 10 nm to 500 nm, more preferably 10 nm to 200 nm. When the thickness of the adhesive layer prior to and after the stretching of the film laminate is within the above range, the separation of the PVA-based film after the stretching and drying processes may be facilitated without damage thereto.

Meanwhile, a material of the adhesive is not particularly limited, and various types of adhesive known in the art to which the present disclosure pertains may be used without limitation. For example, the adhesive layer may be formed of a water-based adhesive or an ultraviolet curable adhesive.

More specifically, the adhesive layer may be formed of a water-based adhesive including at least one selected from the group consisting of a PVA-based resin, an acrylic-based resin, a vinyl acetate-based resin.

Alternatively, the adhesive layer may be formed of a water-based adhesive including a PVA-based resin having an acrylic group and a hydroxyl group. Here, the PVA-based resin having the acrylic group and the hydroxyl group may have a degree of polymerization of about 500 to 1,800.

Alternatively, the adhesive layer may be formed of a water-based adhesive including a PVA-based resin containing an acetoacetyl group and an amine-based metal compound crosslinking agent. More specifically, the adhesive may be an aqueous solution including 100 parts by weight of the PVA-based resin containing the acetoacetyl group and 1 to parts by weight of the amine-based metal compound crosslinking agent.

Here, degrees of polymerization and saponification of the PVA-based resin are not particularly limited as long as the PVA-based resin contains the acetoacetyl group. The PVA-based resin may have a degree of polymerization of 200 to 4,000, and may have a degree of saponification of 70 mol % to 99.9 mol %. Considering the freedom of movement of molecules for a flexible mix of the contained materials, the degree of polymerization may be 1,500 to 2,500 and the degree of saponification may be 90 mol % to 99.9 mol %. Here, the PVA-based resin may include 0.1 mol % to 30 mol % of the acetoacetyl group. Within the above range, reaction between the PVA-based resin and the amine-based metal compound crosslinking agent may be satisfactorily performed, and the adhesive may have desired waterproofing properties.

The amine-based metal compound crosslinking agent may be a water-soluble crosslinking agent containing a functional group having a predetermined reactivity to the PVA-based resin and may be a metal complex containing an amine-based ligand. The metal complex may include a transition metal selected from zirconium (Zr), titanium (Ti), hafnium (Hf), tungsten (W), iron (Fe), cobalt (Co), Nickel (Ni), ruthenium (Ru), osmium (Os), rhodium (Rh), iridium (Ir), palladium (Pd) and platinum (Pt). The ligand coupled to the central metal may include at least one amine group such as a primary amine, a secondary amine (a diamine), a tertiary amine, or ammonium hydroxide.

In addition, the PVA-based resin containing the acetoacetyl group may have a solid content of 1 wt % to 10 wt %. In a case in which the solid content of the PVA-based resin is less than 1 wt %, the adhesive may not secure sufficient waterproofing properties, and thus, it may be less effective in lowering a breakage occurrence rate during the stretching process. In a case in which the solid content of the PVA-based resin exceeds 10 wt %, the workability of the adhesive may deteriorate, and damage to the surface of the PVA-based film at the time of being separated may occur.

Meanwhile, the pH of the adhesive may be 4.5 to 9. In a case in which the pH of the adhesive is within the above range, the adhesive may be further advantageous in terms of storage stability and durability in a highly humid atmosphere.

Meanwhile, the pH of the adhesive may be adjusted by providing an acid to an aqueous solution. Here, the pH adjusting agent may be either a strong acid or a weak acid. For example, the pH adjusting agent may be nitric acid, hydrochloric acid, sulfuric acid, acetic acid or the like.

The thickness of the adhesive layer formed of the aforementioned adhesive may be 80 nm to 200 nm, preferably nm to 150 nm, prior to the stretching of the film laminate, and may be 10 nm to 100 nm, preferably 10 nm to 80 nm, after the stretching of the film laminate. In a case in which the thickness of the adhesive layer is within the above range, adhesive strength between the base film and the PVA-based film may be sustained appropriately, a breakage occurrence rate may be lowered during the stretching process, while damage to the polarizer surface at the time of being separated may be minimized.

In the case of the adhesive, a crosslinking reaction occurs between the amine-based metal compound and the acetoacetyl group of the PVA-based resin at the time of curing the adhesive, waterproofing properties of the adhesive layer after curing may be significantly improved. In a case in which the polymer film and the PVA-based film are stacked using such an adhesive, a phenomenon in which the adhesive is dissolved in water at the time of being wet-stretched may be minimized. Thus, the adhesive may be advantageously used in the wet stretching process.

Meanwhile, the adhesive layer may be formed of an ultraviolet curable adhesive. For example, the adhesive layer may be formed of an ultraviolet curable adhesive including a first epoxy compound having a glass transition temperature of a homopolymer of 120° C. or higher, a second epoxy compound having a glass transition temperature of a homopolymer of 60° C. or lower, and a cationic photopolymerization initiator. Specifically, the ultraviolet curable adhesive may include 100 parts by weight of the first epoxy compound having a glass transition temperature of a homopolymer of 120° C. or higher, 30 to 100 parts by weight of the second epoxy compound having a glass transition temperature of a homopolymer of 60° C. or lower, and 0.5 to 20 parts by weight of the cationic photopolymerization initiator.

The epoxy compound described herein may refer to a compound having one or more epoxy groups in a molecule, preferably having two or more epoxy groups in a molecule, and may be understood as including the forms of a monomer, a polymer and a resin. The epoxy compound according to the exemplary embodiment of the present disclosure may be in the form of a resin.

Meanwhile, the first epoxy compound is not particularly limited so long as it has a glass transition temperature of a homopolymer of 120° C. or higher. For example, an alicyclic epoxy compound and/or an aromatic epoxy compound having a glass transition temperature of a homopolymer of 120° C. or higher may be used as the first epoxy compound in the exemplary embodiment of the present disclosure. Examples of the epoxy compound having a glass transition temperature of a homopolymer of 120° C. or higher include 3,4-epoxycyclohexylmethyl-3,4'-epoxycyclohexanecarboxylate, vinylcyclohexene dioxide dicyclopentadiene dioxide, bis(epoxycyclopentyl)ether, a bisphenol A-based epoxy compound, a bisphenol F-based epoxy compound, and the like. Meanwhile, the first epoxy compound may have a glass transition temperature of a homopolymer ranging from 120° C. to 200° C.

Next, the second epoxy compound is not particularly limited so long as it has a glass transition temperature of a homopolymer of 60° C. or lower. For example, an alicyclic epoxy compound, an aliphatic epoxy compound, or the like may be used as the second epoxy compound in the exemplary embodiment of the present disclosure.

Here, the alicyclic epoxy compound may be a bi-functional epoxy compound, that is, a compound having two epoxy groups, wherein the two epoxy groups are both alicyclic epoxy groups. However, the alicyclic epoxy compound is not limited thereto.

The aliphatic epoxy compound may be an epoxy compound having an aliphatic epoxy group rather than the alicyclic epoxy group. For example, a polyglycidyl ether of aliphatic polyhydric alcohol; a polyglycidyl ether of alkylene oxide addition product of aliphatic polyhydric alcohol; a polyglycidyl ether of aliphatic polyhydric alcohol and polyesterpolyol of aliphatic polyhydric carboxylic acid; a polyglycidyl ether of aliphatic polyhydric carboxylic acid; a polyglycidyl ether of aliphatic polyhydric alcohol and polyester polycarboxylic acid of aliphatic polyhydric carboxylic acid; a dimer, an oligomer, or a polymer obtained through vinyl polymerization of glycidyl acrylate or glycidyl methacrylate; an oligomer or a polymer obtained through vinyl polymerization of a vinyl-based monomer different from glycidyl acrylate or glycidyl methacrylate; or the like may be used as the aliphatic epoxy compound. Preferably, a polyglycidyl ether of aliphatic polyhydric alcohol or of alkylene oxide addition product of aliphatic polyhydric alcohol may be used. However, the aliphatic epoxy compound is not limited thereto.

The aliphatic polyhydric alcohol may be aliphatic polyhydric alcohol having 2 to 20 carbon atoms, 2 to 16 carbon atoms, 2 to 12 carbon atoms, 2 to 8 carbon atoms, or 2 to 4 carbon atoms. For example, the aliphatic polyhydric alcohol may include aliphatic diols such as ethylene glycol, 1,2-propanediol, 1,3-propanediol, 2-methyl-1,3-propanediol, 2-butyl-2-ethyl-1,3-propanediol, 1,4-butanediol, neopentylglycol, 3-methyl-2,4-pentanediol, 2,4-pentanediol, 1,5-pentanediol, 3-methyl-1,5-pentanediol, 2-methyl-2,4-pentanediol, 2,4-diethyl-1,5-pentanediol, 1,6-hexanediol, 1,7-heptanediol, 3,5-heptanediol, 1,8-octanediol, 2-methyl-1,8-octanediol, 1,9-nonanediol, 1,10-decanediol or the like; alicyclic diols such as cyclohexanedimethanol, cyclohexanediol, hydrogenated bisphenol A, hydrogenated bisphenol F; trimethylolethane, trimethylolpropane, hexitols, pentitols, glycerine, polyglycerine, pentaerythritol, dipentaerythritol, tetramethylolpropane, and the like.

In addition, the alkylene oxide may be alkylene oxide having 1 to 20 carbon atoms, 1 to 16 carbon atoms, 1 to 12 carbon atoms, 1 to 8 carbon atoms, or 1 to 4 carbon atoms. For example, the alkylene oxide may include ethyleneoxide, propyleneoxide, butyleneoxide, and the like.

Furthermore, the aliphatic polyhydric carboxylic acid may, for example, include oxalic acid, malonic acid, succinic acid, glutaric acid, adipic acid, pimelic acid, suberic acid, azelaic acid, sebacic acid, dodecanoic acid, 2-methylsuccinic acid, 2-methyladipic acid, 3-methyladipic acid, 3-methylpentanoic acid, 2-methyloctanoic acid, 3,8-dimethyl decanoic acid, 3,7-dimethyl decanoic acid, 1,20-eicosamethylenedicarboxylic acid, 1,2-cyclopentanedicarboxylic acid, 1,3-cyclopentanedicarboxylic acid, 1,2-cyclohexanedicarboxylic acid, 1,3-cyclohexanedicarboxylic acid, 1,4-cyclohexanedicarboxylic acid, 1,4-dicarboxylmethylenecyclohexane, 1,2,3-propanetricarboxylic acid, 1,2,3,4-butanetetracarboxylic acid, 1,2,3,4-cyclobutanetetracarboxylic acid, and the like, but is not limited thereto.

Preferably, the second epoxy compound in the exemplary embodiment of the present disclosure may include one or more glycidyl ether groups. For example, the second epoxy compound in the exemplary embodiment of the present disclosure may be at least one selected from the group consisting of 1,4-cyclohexanedimethanol diglycidyl ether, 1,4-butanediol diglycidyl ether, 1,6-hexanediol diglycidyl ether, neopentyl glycol diglycidyl ether, resorcinol diglycidyl ether, diethylene glycol diglycidyl ether, ethylene glycol diglycidyl ether, trimethylolpropanetriglycidyl ether, n-butyl diglycidyl ether, 2-ethylhexyl glycidyl ether, phenyl glycidyl ether, and o-cresyl glycidyl ether.

Meanwhile, the second epoxy compound may have a glass transition temperature of a homopolymer ranging from 0° C. to 60° C.

Meanwhile, according to the exemplary embodiment of the present disclosure, a combination of the first epoxy compound containing at least one epoxidized alicyclic group and the second epoxy compound containing at least one glycidyl ether group may preferably be used as the epoxy compound, without being limited thereto.

Next, the stretching of the film laminate may be performed at a temperature of 45° C. to 55° C. As a result of research conducted by the inventors, it has been found that optical properties, such as transmittance, polarization, chromaticity and the like, may be improved by using the thermoplastic polyurethane film as the base film and stretching the film at an appropriate temperature.

Meanwhile, the stretching process may be performed at a stretching magnification of 5 to 15 times, preferably of 5 to 10 times. In consideration of the optical properties, a stretching magnification of 6 to 8 times may be particularly preferable.

Meanwhile, the stretching process may be performed through wet stretching or dry stretching, but is not limited thereto. The wet stretching process may be preferable to the dry stretching process, in that it may be stably performed without a separate medium because it allows for stronger surface adhesion strength between the thermoplastic polyurethane film and the PVA-based film than the dry stretching process.

Meanwhile, the stretching process may be performed together with at least one process of dyeing the PVE-based film with iodine and/or a dichroic dye and crosslinking the PVE-based film with the dyed iodine and/or dichroic dye.

For example, the stretching process may be performed in an aqueous solution containing iodine and/or a dichroic dye along with a boric acid, so that the dyeing, crosslinking and stretching processes may be performed simultaneously. Alternatively, after the dyeing process is performed by dipping the film laminate into an aqueous solution containing iodine and/or a dichroic dye, the crosslinking and stretching processes may be simultaneously performed by dipping the dyed film laminate into an aqueous boric acid solution and stretching the same in the aqueous boric acid solution.

Meanwhile, the stretching process may be performed in the aqueous boric acid solution having a boric acid concentration of 1% to 5%, preferably 1% to 4%, more preferably 1% to 3%. In the case of performing the stretching process in the aqueous boric acid solution having the above concentration range, the degree of polarization of the polarizer may be improved.

Meanwhile, the stretching process may be performed to allow the PVA-based film to have a thickness of 10 μm or less. For example, the PVA-based film may be stretched to have a thickness of 1 μm to 10 μm, a thickness of 3 μm to 10 μm, or a thickness of 1 μm to 5 μm.

In addition, the stretching process may be performed by allowing for a contraction rate of the PVA-based film in a width direction thereof to be 30% to 80%, preferably 60% to 80%. In a case in which the width contraction rate of the PVA-based film is within the above range, superior optical properties may be obtained.

Meanwhile, after the stretching process, the film laminate may be dried as necessary. Here, in consideration of the optical properties of the polarizer, the drying process may be performed at 20° C. to 100° C., preferably 40° C. to 90° C., and a drying time may be 1 to 10 minutes.

Figure 1:
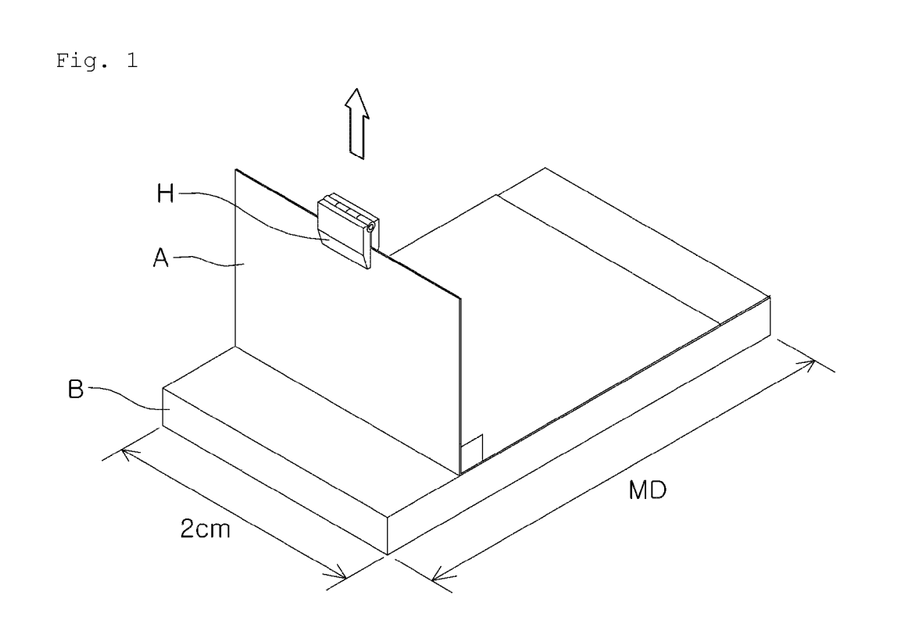
FIG. 1 is a view illustrating a method of measuring adhesive strength using a texture analyzer.

Meanwhile, an adhesive strength between the stretched PVA-based film and the stretched polyurethane film after the stretching of the film laminate may be 2N/2 cm or less, preferably 0.1 to 2N/2 cm, more preferably 0.1 to 1N/2 cm. In a case in which the adhesive strength between the stretched PVA-based film and the stretched polyurethane film is within the above range, damage to the surfaces thereof may be minimized during the separation thereof. In the manufacturing method according to the exemplary embodiment of the present disclosure, in a case in which the adhesive layer is formed between the PVA-based film and the polyurethane film, the adhesive layer may be stretched along with the PVA-based film and the polyurethane film, and thus, a thickness of the adhesive layer may be reduced to 10% to 50% of the original thickness thereof before being stretched. As a result, the adhesive strength between the PVA-based film and the polyurethane film may be lowered to be 2N/2 cm or less, so that they may be separated from each other with ease. Meanwhile, the adhesive strength refers to adhesion measured in the case of attaching sample films having a length of 2 cm, and a measurement method is illustrated in FIG. 1. In the exemplary embodiment of the present disclosure, the adhesive strength between the films refers to a peel strength measured while the PVA film A of the film laminate is peeled off from the polyurethane film B by applying force in a direction perpendicular to a plane direction of the film laminate, after the PVA film A of the film laminate is fixed using a sample holder H. Here, a measuring device was a Texture Analyzer (Model name: TA-XT Plus) by Stable Micro Systems.

Then, the stretched PVA-based film may be separated from the thermoplastic polyurethane film. In the separation process, weak peel strength may be applied to the PVA-based film or the thermoplastic polyurethane film to allow both of the films to be separated from each other. Here, the degree of peel strength may be 2N/2 cm or less. For example, the degree of peel strength may be 0.1 to 2N/2 cm, preferably 0.1 to 1N/2 cm. In the exemplary embodiment of the present disclosure, since the degree of peel strength required for separating the PVA-based film and the polymer film is significantly weak, as compared to a case of stacking films using a coating or co-extruding method, the two films may be easily separated from each other without a separate process or device. Furthermore, damage to the PVA-based film may be reduced during the separation process, whereby significantly superior optical performance may be exhibited.

Meanwhile, the method of manufacturing a thin film polarizer according to the exemplary embodiment of the present disclosure may be performed using processes known in the art to which the present disclosure pertains, such as a sheet-to-sheet process, a sheet-to-roll process, a roll-to-roll process, or the like. Here, the sheet-to-sheet process uses sheet-fed films having a predetermined size as raw material films (that is, the PVA-based film and the polyurethane film), while the sheet-to-roll process uses a long roll film wound on a roller as one of the raw material films and a sheet-fed film having a predetermined size as the other raw material film. In addition, the roll-to-roll process uses roll films as the raw material films. In consideration of process continuity and productivity, the roll-to-roll process may be used in particular.

For example, the method of manufacturing a thin film polarizer according to an exemplary embodiment of the present disclosure may include forming a film laminate by attaching a polyurethane film and a PVA-based film while unwinding the polyurethane film and the PVA-based film from a polyurethane film roll and a PVA-based film roll, respectively; stretching the film laminate at a temperature of 45° C. to 55° C.; and separating the PVA-based film from the thermoplastic polyurethane film.

Meanwhile, after the polyurethane film and the PVA-based film are attached to each other, they may be re-wound on a roll, and then the film laminate may be subsequently unwound from the re-wound film laminate roll and be introduced to the stretching process, or may be introduced to the stretching process without the rewinding process.

In addition, the separation process may be performed by inserting a peeling device (for example, a peeling roll) between the polyurethane film and the PVA-based film, separating an interface between the polyurethane film and the PVA-based film, and winding the separated polyurethane film and the separated PVA-based film on different rolls.

The polarizer manufactured using the aforementioned method may have a thickness of 10 μm or less. For example, the polarizer may have a thickness of 1 μm to 10 μm, 3 μm to 10 μm, or 1 μm to 5 μm, being significantly thin. In addition, even with such a significantly reduced thickness, the polarizer may have a single transmittance of 40% to 45% and a degree of polarization of 99% or higher, preferably 99.5% or higher, more preferably 99.7% or higher, exhibiting significantly superior optical properties.

In addition, the polarizer according to the exemplary embodiment of the present disclosure may have significantly superior uniformity in the degree of polarization in the width direction. Specifically, a standard deviation in degrees of polarization measured at 10 equidistant points of the polarizer in the width direction may be 0.002% or less. The superior uniformity in the degree of polarization of the polarizer in the width direction according to the exemplary embodiment of the present disclosure is because the stretching process can be performed uniformly throughout the entire region of the PVA-based film in the width direction since the thermal contraction characteristics of the polyurethane film used as the base film is similar to that of the PVA-based film.

Meanwhile, a polarizing plate may be formed by stacking a transparent film on one surface or both surfaces of the aforementioned polarizer. Here, various types of film used as polarizer protective films or retardation films in the art to which the present disclosure pertains may be used as the transparent film, without limitation. For example, a cellulose-based film, an acrylic-based film, a cycloolefin-based film, or the like, may be used therefor.

The stacking of the polarizer and the transparent film is not particularly limited, and may be performed using an adhesive, a gluing agent or the like, commonly known in the art to which the present disclosure pertains. Here, the adhesive or the gluing agent may be properly selected by taking account of a material of the used transparent film or the like. For example, in a case in which the transparent film is a triacetyl cellulose (TAC) film, a water-based adhesive such as a PVA-based adhesive may be used. In a case in which the transparent film is an acrylic film, a cycloolefin polymer (COP) film, or the like, a photocurable or thermosetting adhesive such as an acrylic-based adhesive, an epoxy-based adhesive, or the like, may be used.

Meanwhile, the method of stacking the polarizer and the transparent film is not particularly limited, and may be performed through a roll-to-roll process using a polarizer film roll and a transparent film roll by taking productivity into account. Since the method of manufacturing the polarizing plate by stacking the polarizer and the transparent film using the roll-to-roll process is known in the art, a detailed description thereof will be omitted. In the case of manufacturing the polarizing plate using the roll-to-roll process, a long roll-type polarizing plate may be obtained.

Meanwhile, the polarizing plate according to the exemplary embodiment of the present disclosure may further include a functional optical layer, such as a luminance improving film, a primer layer, a hard coating layer, a glare proof layer, an anti-reflection layer, a bonding layer for bonding with a liquid crystal panel or the like, in addition to the transparent film. Methods of forming such optical layers are not particularly limited, and may be methods commonly known in the art to which the present disclosure pertains.

Since the polarizing plate according to the exemplary embodiment of the present disclosure is relatively thin and has superior optical properties as compared with existing polarizing plates, it may be advantageously used in display devices such as liquid crystal display (LCD) panels, organic electroluminescence devices, and the like.

MODE FOR DISCLOSURE

Hereinafter, the present disclosure will be provided in detail with reference to concrete examples.

Inventive Example 1

A film laminate was formed by stacking a PVA film having a thickness of 30 μm on both surfaces of a polyurethane film having a thickness of 60 μm. After the film laminate was swollen in a pure water solution at 25° C. for 15 seconds, the film laminate was dyed in an iodine solution having an iodine concentration of 0.3 wt % at 25° C. for 60 seconds. Then, after the film laminate was subjected to a cleaning process in a solution having a boric acid concentration of 1 wt % for 15 seconds, the film laminate was stretched at a magnification of 7 times in a solution having a boric acid concentration of 2 wt % at 45° C. After the stretching process, the film laminate was subjected to a complementing process in a solution having a KI concentration of 5 wt %, and was then dried in an oven at 80° C. for 5 minutes. Thereafter, the polyurethane film and the PVA film were separated from each other, and thus, a thin film polarizer having a thickness of 7.5 μm was finally prepared.

Inventive Example 2

A thin film polarizer according to Inventive Example was manufactured using the same method as that of Inventive Example 1, with the exception of the stretching process being performed in a solution having a boric acid concentration of 2 wt % at 52° C.

Inventive Example 3

A thin film polarizer according to Inventive Example was manufactured using the same method as that of Inventive Example 1, with the exception of the stretching process being performed in a solution having a boric acid concentration of 2 wt % at 55° C.

Experimental Example 1

Optical properties of the thin film polarizers prepared by Inventive Examples 1 to 3, such as single transmittance, degree of polarization, single color, and cross color, were measured using a JASCO V-7100 Spectrophotometer, and the measurement results are shown in Table 1.

TABLE 1

| | Stretching Temperature | Single Transmittance (Ts, %) | Degree of Polarization (DOP, %) | Single Color | | Cross Color | |
|---|---|---|---|---|---|---|---|
| | | | | a | b | a | b |
| Inventive Example 1 | 45° C. | 42.10 | 99.6714 | −0.13 | 1.10 | 2.14 | −4.51 |
| Inventive Example 2 | 50° C. | 42.09 | 99.9226 | −0.27 | 1.73 | 1.41 | −2.65 |
| Inventive Example 3 | 55° C. | 42.01 | 99.9219 | −0.37 | 1.63 | 1.37 | −2.83 |

As shown in Table 1, in the case in which the polyurethane film was used as a base film, the degree of polarization was 99.5% or higher, exhibiting superior optical properties. In particular, in the case of a stretching temperature of 50° C. to 55° C., the degree of polarization was 99.9% or higher, exhibiting remarkably excellent optical properties.

Inventive Example 4

A film laminate was formed by stacking a PVA film having a thickness of 30 μm on both surfaces of a polyurethane film having a thickness of 60 μm. After the film laminate was swollen in a pure water solution at 25° C. for 15 seconds, the film laminate was dyed in an iodine solution having an iodine concentration of 0.27 wt % at 25° C. for 60 seconds. Then, after the film laminate was subjected to a cleaning process in a solution having a boric acid concentration of 1 wt % for 15 seconds, the film laminate was stretched at a magnification of 7 times in a solution having a boric acid concentration of 2 wt % at 50° C. After the stretching process, the film laminate was subjected to a complementing process in a solution having a KI concentration of 5 wt %, and then was dried in an oven at 80° C. for 5 minutes. Thereafter, the polyurethane film and the PVA film were separated from each other, and thus, a thin film polarizer having a thickness of 7.5 μm was finally prepared.

Inventive Example 5

A thin film polarizer according to Inventive Example was manufactured using the same method as that of Inventive Example 4, with the exception of the stretching process being performed in a solution having a boric acid concentration of 2.5 wt %.

Inventive Example 6

A thin film polarizer according to Inventive Example was manufactured using the same method as that of Inventive Example 4, with the exception of the stretching process being performed in a solution having a boric acid concentration of 3.5 wt %.

Experimental Example 2

Optical properties of the thin film polarizers prepared by Inventive Examples 4 to 6, such as single transmittance, degree of polarization, single color, and cross color, were measured using a JASCO V-7100 Spectrophotometer, and the measurement results are shown in Table 2.

TABLE 2

| | Single Transmittance (Ts, %) | Degree of Polarization (DOP, %) | Single Color | | Cross Color | |
|---|---|---|---|---|---|---|
| | | | a | b | a | b |
| Inventive Example 4 | 43.02 | 99.6269 | −0.15 | 1.52 | 1.90 | −2.00 |
| Inventive Example 5 | 43.20 | 99.5939 | −0.25 | 1.69 | 1.26 | −2.70 |
| Inventive Example 6 | 43.01 | 99.2278 | −0.14 | 1.75 | 1.55 | −1.04 |

According to Table 2, in the case in which the polyurethane film was used as a base film, the degree of polarization was relatively lowered at the boric acid concentration of 3.5 wt %, as compared with the boric acid concentrations of 2.0 wt % and 2.5 wt % in Inventive Examples 4 and 5, respectively.

Inventive Example 7

A film laminate was formed by stacking a PVA film having a thickness of 30 μm on both surfaces of a polyurethane film having a thickness of 60 μm. After the film laminate was swollen in a pure water solution at 25° C. for 15 seconds, the film laminate was dyed in an iodine solution having an iodine concentration of 0.29 wt % at 25° C. for 60 seconds. Then, after the film laminate was subjected to a cleaning process in a solution having a boric acid concentration of 1 wt % for 15 seconds, the film laminate was stretched at a magnification of 6.5 times in a solution having a boric acid concentration of 2 wt % at 50° C. After the stretching process, the film laminate was subjected to a complementing process in a solution having a KI concentration of 5 wt %, and then was dried in an oven at 80° C. for 5 minutes. Thereafter, the polyurethane film and the PVA film were separated from each other, and thus, a thin film polarizer having a thickness of 7.5 μm was finally prepared.

Inventive Example 8

A thin film polarizer according to Inventive Example was manufactured using the same method as that of Inventive Example 7, with the exception of the stretching process being performed at a magnification of 7 times.

Inventive Example 9

A thin film polarizer according to Inventive Example was manufactured using the same method as that of Inventive Example 7, with the exception of the stretching process being performed at a magnification of 7.5 times.

Experimental Example 3

Degrees of single transmittance and polarization of the thin film polarizers prepared by Inventive Examples 7 to 9 were measured using a JASCO V-7100 Spectrophotometer, and the measurement results are shown in Table 3.

TABLE 3

| | Single Transmittance (Ts, %) | Degree of Polarization (DOP, %) |
|---|---|---|
| Inventive Example 7 | 42.37 | 99.7593 |
| Inventive Example 8 | 42.35 | 99.9086 |
| Inventive Example 9 | 41.60 | 99.8564 |

Comparative Example 1

A thin film polarizer according to Comparative Example 1 was manufactured using the same method as that of Inventive Example 5, with the exception of the use of a polyethylene film having a thickness of 90 μm instead of a polyurethane film having a thickness of 60 μm.

Comparative Example 2

A thin film polarizer according to Comparative Example 2 was manufactured using the same method as that of Inventive Example 8, with the exception of the use of a polypropylene film having a thickness of 50 μm instead of a polyurethane film having a thickness of 60 μm.

Comparative Example 3

Figure 2:
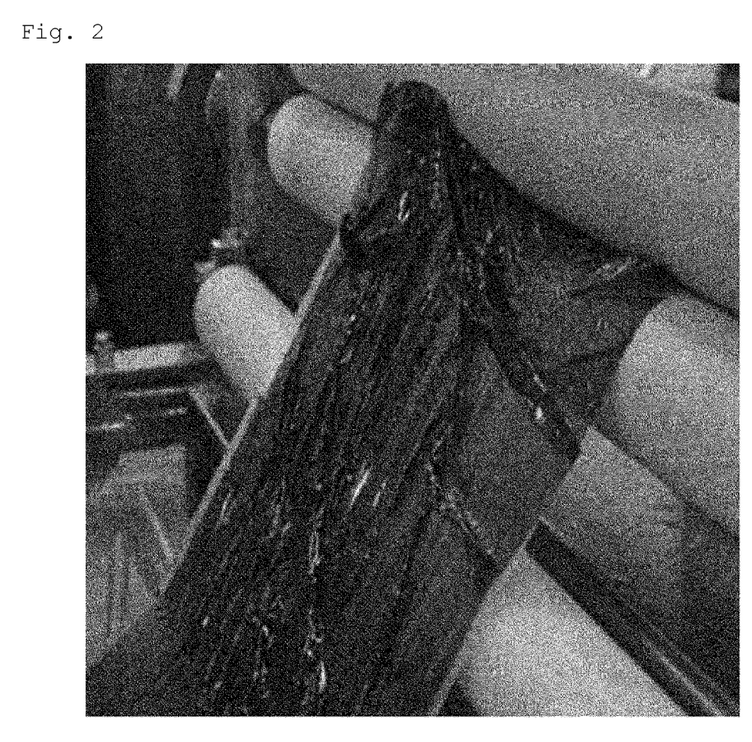
FIG. 2 is a photograph illustrating the breakage of a film laminate according to Comparative Example 3 during a stretching process.

A thin film polarizer according to Comparative Example 3 was attempted to be manufactured using the same method as that of Inventive Example 8, with the exception of the use of a polyethylene terephthalate film having a thickness of 40 μm instead of a polyurethane film having a thickness of 60 μm; however, breakage occurred during the stretching process, resulting in a failure to manufacture the thin film polarizer. FIG. 2 is a photograph illustrating a state of the film laminate according to Comparative Example 3 during the stretching process.

Comparative Example 4

A thin film polarizer according to Comparative Example 4 was manufactured using the same method as that of Inventive Example 1, with the exception of the stretching process being performed in a solution having a boric acid concentration of 2 wt % at 40° C.

Comparative Example 5

A thin film polarizer according to Comparative Example 4 was manufactured using the same method as that of Inventive Example 1, with the exception of the stretching process being performed in a solution having a boric acid concentration of 2 wt % at 60° C.

Experimental Example 4: Measurement of Optical Properties

Optical properties of the thin film polarizers prepared by Inventive Examples 1 to 3, 4 and 5, such as single transmittance, degree of polarization, single color, and cross color, were measured using a JASCO V-7100 Spectrophotometer, and the measurement results are shown in Table 4.

TABLE 4

| | Single Transmittance (Ts, %) | Degree of Polarization (DOP, %) | Single Color | | Cross Color | |
|---|---|---|---|---|---|---|
| | | | a | b | a | b |
| Comparative Example 1 | 43.29 | 93.0947 | 1.35 | 0.62 | 5.93 | −1.90 |
| Comparative Example 2 | 42.56 | 98.7137 | 0.25 | 1.12 | 2.97 | −2.68 |
| Comparative Example 4 | 41.91 | 98.5201 | −0.39 | 1.58 | 1.32 | −2.91 |

TABLE 4-continued

|  | Single Transmittance (Ts, %) | Degree of Polarization (DOP, %) | Single Color a | Single Color b | Cross Color a | Cross Color b |
|---|---|---|---|---|---|---|
| Comparative Example 5 | 42.32 | 98.4843 | −0.06 | 0.84 | 2.14 | −4.02 |

With reference to Tables 1 to 4, it can be seen that the thin film polarizers manufactured using the polyurethane film as the base film according to Inventive Examples 1 to 9 exhibited significantly superior optical properties, in terms of single transmittance, polarization, chromaticity and the like, as compared with the polarizers manufactured using different base films according to Comparative Examples 1 and 2.

Experimental Example 5: Evaluation of Uniformity in Degree of Polarization

With respect to the polarizers manufactured according to Inventive Example 2 and Comparative Example 1, the degrees of polarization were measured at 10 equidistant points of each polarizer in the width direction, and then a standard deviation in the measured degrees of polarization was calculated. The measurement results are shown in Table 5.

TABLE 5

| | Degree of Polarization (%) | |
|---|---|---|
| Position | Inventive Example 2 | Comparative Example 1 |
| 1 | 99.9238 | 93.1204 |
| 2 | 99.9206 | 93.0546 |
| 3 | 99.9211 | 93.0746 |
| 4 | 99.9228 | 93.1045 |
| 5 | 99.9244 | 93.1605 |
| 6 | 99.9241 | 93.1732 |
| 7 | 99.9227 | 93.0846 |
| 8 | 99.9219 | 93.0582 |
| 9 | 99.9207 | 93.0284 |
| 10 | 99.9235 | 92.0875 |
| Average | 99.9226 | 93.0947 |
| Standard Deviation | 0.0014 | 0.0461 |

EXPLANATION OF REFERENCE NUMERALS

H: a holder
A: a polyvinyl alcohol film
B: a polymer film
MD: a longitudinal stretching

The invention claimed is:

1. A method of manufacturing a thin film polarizer, the method comprising:
    forming a film laminate by attaching a prefabricated non-stretched polyvinyl alcohol (PVA)-based film to at least one surface of a thermoplastic polyurethane film, using attractive force therebetween or using an adhesive;
    stretching the film laminate at a temperature of 45° C. to 55° C.; and
    separating the PVA-based film from the thermoplastic polyurethane film.

2. The method of claim 1, wherein the stretching of the film laminate is performed at a temperature of 50° C. to 55° C.

3. The method of claim 1, wherein the stretching of the film laminate is performed at a magnification of 5 to 15 times.

4. The method of claim 1, wherein the non-stretched PVA-based film has a thickness of 10 μm to 60 μm.

5. The method of claim 1, wherein the stretching of the film laminate is performed in an aqueous boric acid solution having a boric acid concentration of 1% to 5%.

6. The method of claim 1, wherein the stretching of the film laminate is performed in an aqueous boric acid solution having a boric acid concentration of 1% to 3%.

7. The method of claim 1, wherein the stretching of the film laminate is performed to allow the PVA-based film to have a thickness of 10 μm or less.

8. The method of claim 1, wherein the stretching of the film laminate is performed to allow for a contraction rate of the PVA-based film in a width direction thereof to be 30% to 80%.

9. The method of claim 1, wherein an adhesive strength between the stretched PVA-based film and the stretched polyurethane film after the stretching of the film laminate is 2N/2 cm or less.

10. The method of claim 1, wherein the separating of the PVA-based film from the thermoplastic polyurethane film is performed using a peel strength of 2N/2 cm or less.

11. The method of claim 1, further comprising dyeing the film laminate with at least one of iodine and a dichroic dye, prior to the stretching of the film laminate.

12. The method of claim 1, further comprising drying the stretched film laminate after the stretching of the film laminate.

* * * * *